United States Patent [19]

Curchod

[11] 3,984,220

[45] Oct. 5, 1976

[54] CHIMNEY FOR PURIFYING SMOKE OF GASES

[76] Inventor: Jacques Curchod, Chemin du Lac, 1181 Mont sur Rolle, Switzerland

[22] Filed: May 21, 1974

[21] Appl. No.: 471,994

[30] Foreign Application Priority Data
May 25, 1973 Switzerland.......................... 7495/73

[52] U.S. Cl.................................. 55/238; 55/223; 55/241; 55/385 R; 55/457; 261/17; 261/79 A; 261/112; 261/DIG. 9; 98/58; 110/119; 110/184; 52/218
[51] Int. Cl.².......................................... B01D 47/16
[58] Field of Search ............ 55/235, 236, 237, 238, 55/240, 436, 456, 457, 241, 222, 223, 227, 263, 269, 385 R; 98/60, 58, 59; 110/119, 184, 180; 75/95; 261/DIG. 9, 79 A, DIG. 54, 158, 160, 17, 112; 23/283; 266/43, 15; 52/219, 218

[56] References Cited
UNITED STATES PATENTS

| 516,664 | 3/1894 | Storer ................................. 55/223 |
| 2,360,776 | 10/1944 | Kozak et al......................... 198/213 |
| 2,607,438 | 8/1952 | Bailey ................................. 55/263 |

Primary Examiner—Frank W. Lutter
Assistant Examiner—David L. Lacey
Attorney, Agent, or Firm—Robert E. Burns; Emmanuel J. Lobato; Bruce L. Adams

[57] ABSTRACT

A chimney for purifying smoke or gases has a tubular lining within the chimney on which a cleaning liquid downwardly flows. A central helicoidal surface composed of a plurality of piled helical elements, imparts a helical movement to smoke or gases rising through the chimney, whereby impurities impinge on the film of liquid and are washed down. The lining can consist of a plurality of single or double walled tubular elements piled end-to-end and possibly arranged to supply the liquid in cascade.

8 Claims, 11 Drawing Figures

CHIMNEY FOR PURIFYING SMOKE OF GASES

The invention relates to chimneys for the purification of smoke or gases by the removal of soot or odors of organic origin.

At the present time, to reduce pollution it is becoming ever-increasingly necessary to eliminate soot from industrial and domestic smoke and simultaneously to eliminate organic odors emanating therefrom. Considerable research has been made in this field and various solutions have been proposed, but for the moment there is still not available on the market a simple and relatively inexpensive device which can be incorporated in both small and large capacity chimneys and in particular in existing chimneys. There are for example known for special uses, washing towers, electro-filters and active carbon filters which must, however, be replaced frequently.

As early as 1903, it had already been proposed in U.S. Pat. No. 793,110 to provide a gas purifier formed by a tower-like shell in which gases rise with a forced rotary movement by means of an axially disposed spiral flange which compels the gases to impinge against the inner face of the shell down which water is made to flow.

This arrangement, although based on a valid principle, has not been used up to present, at least on a widespread scale, since its construction involves practical difficulties and it is in particular unsuitable for incorporation in existing chimneys.

An object of the invention is to enable the construction of a chimney embodying the principle of the above specified arrangement by simple means.

Accordingly, the invention includes structure, in a chimney for removing impurities from smoke and gases, comprising a central helicoidal surface imparting a helical movement to smoke and gases rising through the chimney, and a fluid circuit or flowpath for supplying washing liquid to flow down the chimney, the improvement comprising a tubular inner lining along which the washing liquid flows, and wherein the helicoidal surface is formed of a plurality of helicoidal elements disposed end-to-end.

Several embodiments of the invention with now be described, by way of example, with reference to the accompanying schematic drawings, in which.

The known purifying process used can advantageously be applied to already existing chimneys and for this purpose the means employed for equipping the chimney are different according to whether it can be equipped from the top or from the bottom. In both cases, the chimney includes an outer casing 1 of sheet metal or masonry and its central part is occupied by a helicoidal surface 2 which forces the rising smoke to be evacuated to adopt a helical movement.

Figure 1:
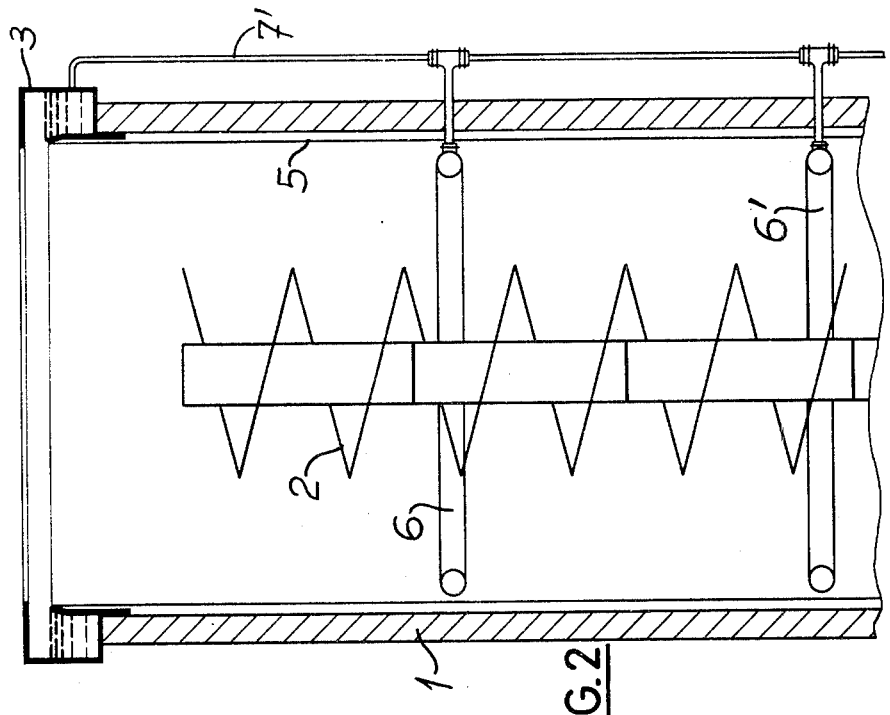
FIG. 1 is a diagrammatic view of part of a chimney operating according to the known principle.
Figure 2:
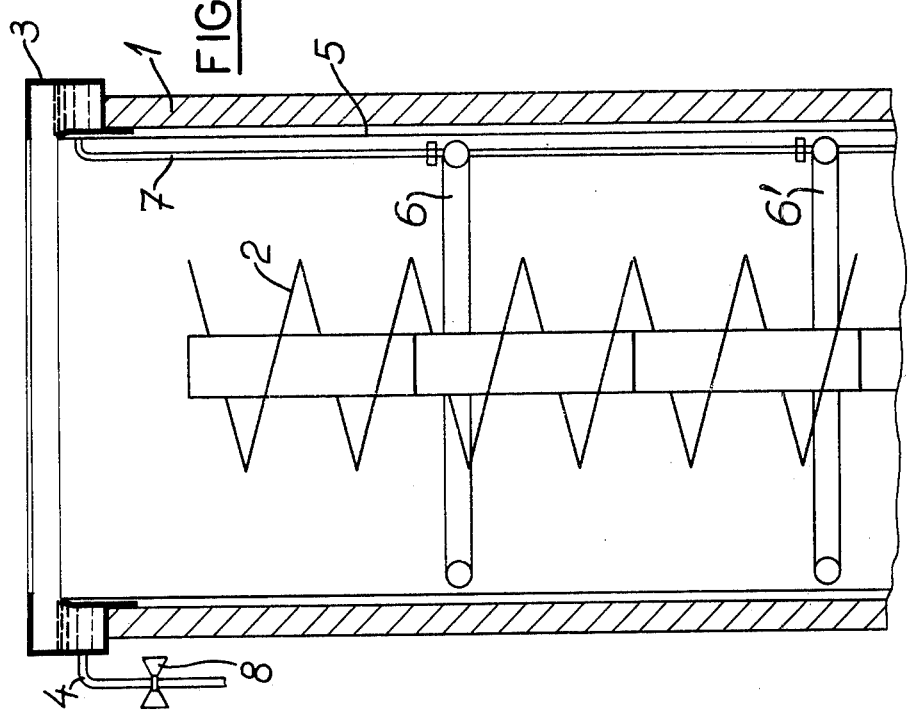
FIG. 2 is a similar view of a variation.

The chimney is also equipped with a circuit for supplying washing liquid. In the case of FIGS. 1 and 2 which show chimneys which can be equipped via the open upper end, the supply circuit comprises an annular trough 3 open at its inner periphery and to which washing water is delivered by an inlet pipe 4 (FIG. 1). Trough 3 is placed on and directly above the upper end of the casing 1, and the washing water flows through the peripheral opening of trough 3 down the inner wall of the chimney formed by an inner lining 5 disposed within the casing 1 and made for example of a tube of thin stainless steel. This tubular lining 5 may be comprised of a helicoidal structure by fixing together overlapping wound sections of sheet metal, which augment the helical movement of rising smoke. According to the nature and the temperature of the gases to be evacuated, the lining could also be in a suitable synthetic plastic material.

In the case of a relatively tall chimney, several liquid supply outlets are provided in the form of rings 6,6' spaced apart in the chimney by a suitable amount according to the output and temperature of the gases so as to compensate for losses due to evacuation. The liquid flow rate can be estimated by a simple calorimetric calculation taking into account the fact that the film of water should at the least be close to 1 mm thick. The supply pipe 4 to trough 3 has a needle valve 8 which enables regulation of the liquid supply, and each ring 6,6' can have an electro-magnetic valve, possibly controlled by a probe.

The rings 6,6' are supplied by a tube 7, possibly flexible, connected to trough 3, and are all fixed in the lining 5 prior to its introduction in the chimney.

The supply of liquid through rings 6,6' can take place through a series of perforations about these rings, the dimensions and numbers of these perforations being calculated as a function of the required pressures and head losses to provide the desired fluid outputs.

FIG. 1 shows a supply tube 7 disposed inside the chimney to avoid the possibility of freezing. In this case, tube 7 is a corrosion resistant material. In the variation of FIG. 2, a supply tube 7' is placed outside the chimney whose casing 1 has holes at the levels of rings 6,6' for passage of connecting tubes. In this case, the rings 6,6' can be provided with needle valves manually operable from the exterior.

According to a variation, not shown, the inner lining could be double-walled and serve for passage of the liquid to be dispensed in the chimney. In this case, the inner wall of the lining can be perforated with a multitude of very small holes, generally between 0.5 and 0.1 mm diameter with 1 hole per $dm^2$, the exact dimensions and spacing of which can be calculated as a function of the given parameters of a chimney, namely the diameter, height, output, and gas temperature.

This type of double-walled chimney is suitable in the case of a new chimney built without masonry. The thickness of the sheet metal and the braces, ties or other supports can be calculated as a function of the stresses, expected winds and so on. This type is particularly appropriate for low-height chimneys, and it to necessary to encircle the inside of the chimney to avoid accidents due to pressure.

Figure 3:
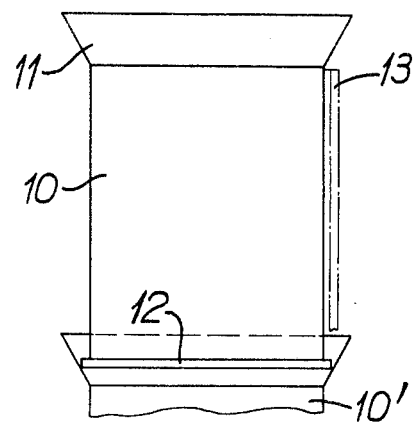
FIG. 3 is an elevational view showing tubular elements which can be piled end-to-end.
Figure 4:
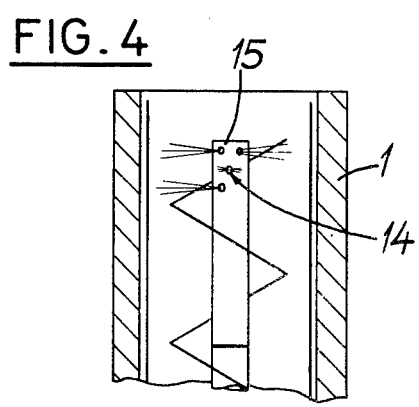
FIGS. 4 and 5 show two devices for supplying cleaning liquid.
Figure 5:
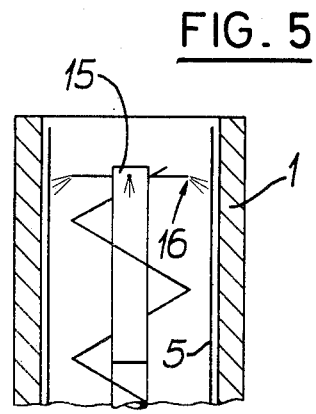

In the embodiment of FIG. 3, the tubular lining is formed by tubular elements 10 which can be introduced through the top end of an existing chimney, the length of these elements being chosen as a function of the possibilities of scaffolding or the reach of a crane. The elements 10 are either single walled in which case washing liquid is supplied by a central conduit, or double walled as described further on. Each element 10,10' is terminated at its upper end by an outflaring frusto-conical part 11 which serves to guide and support an element placed thereon as for example element 10 placed on element 10'. The lower part of each element has a circular flange 12 which rests in the part 11 of the supporting element. These elements are advantageously manufactured in sheet steel of a thickness calculated as a function of the weight. The thickness of the sheet metal can progressively decrease, i.e. from the bottom of the lower element to the top of the uppermost one. Vertical ribs 13, or other reinforcements can be provided on the exterior of the elements. For single walled elements washing water is supplied by a central column 15 in which water flows under pressure and is projected against the wall of the lining either through perforations 14 in column 15 (FIG. 4), or through pipes 16 secured at the upper end of column 15 (FIG. 5), or by other appropriate means.

Figure 6:
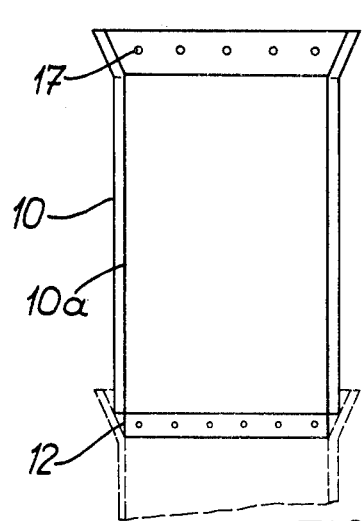
FIG. 6 is a diagram showing a varied form of pilable tubular elements.
Figure 7:
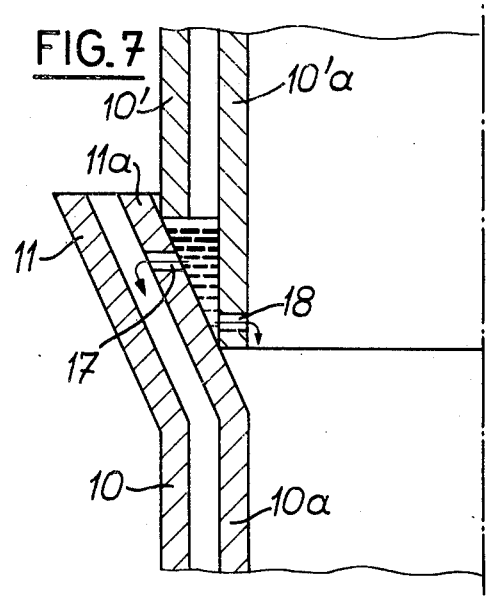
FIG. 7 is an enlarged-scale cross-section of a detail of FIG. 6.

FIGS. 6 and 7 show double-walled tubular elements 10 between the walls of which the washing liquid flows, the washing liquid being supplied in cascade from an upper trough or from the uppermost element. To this end, the inner wall 10a of each element is provided at its upper end, i.e. in the frusto-conical part 11a, with a series of annularly-disposed perforations 17 and in its lower part 12 which extends beyond the outer wall, with another series of annularly disposed perforations 18, smaller than perforations 17 but which provide a sufficient flow of liquid inside the lining.

FIG. 7 shows in detail the fitting together of adjacent elements. The liquid flowing down between the walls 10',10'a of the upper element accumulates in a reservoir formed by the upper frusto-conical part 11a of the lower element mating with the ends of walls 10', 10'a. The liquid then flows by two paths, between the walls 10,10'a of the lining through perforations 17, or inside the wall 10a through perforations 18. The size of perforations 18 is calculated as a function of the flow through the preceding (i.e. upper) stages or elements, to provide a sufficient flow.

Figure 8:
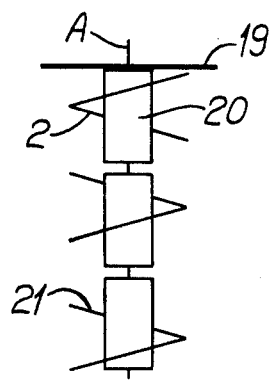
FIG. 8 is a schematic elevational view of a central column.

It can be seen from FIGS. 1, 2, 4 and 5 that the central part of the chimney carrying helicoidal surface 2 is composed of a plurality of elements disposed end-to-end, and this will now be described in detail. This helicoidal surface causes rising gases to rise upwardly with a helical movement which enables them to remain for a longer time in contact with the film of washing liquid which will wash down the impurities. The centrally-located helical surface can be provided in various manners. In the case of insertion in the chimney from the top, the helicoidal surface can be formed by a plurality of independent tubular elements 20 (FIG. 8) about the periphery of which are disposed helically-formed split washers or flanges or convolutions 21. The elements 20 are suspended by a cable A along which they are slid one by one into the chimney. At each end of the column, and also at intermediate locations in the case of a tall chimney, spacers 19 are provided to maintain the helicoidal surface centrally within the chimney.

In a case where a natural depression of the chimney is insufficient to produce an adequate helical movement to the rising gases, the effect can be increased, for example by means of a ventilator which may place the smoke under pressure, or by providing additional air at high speed to drive the smoke or gases and simultaneously lower the temperature. Air under pressure can be supplied via a single-walled central column in the case where the liquid is supplied by other means, or via a double-walled central column which can simultaneously serve to supply liquid.

Figure 9:
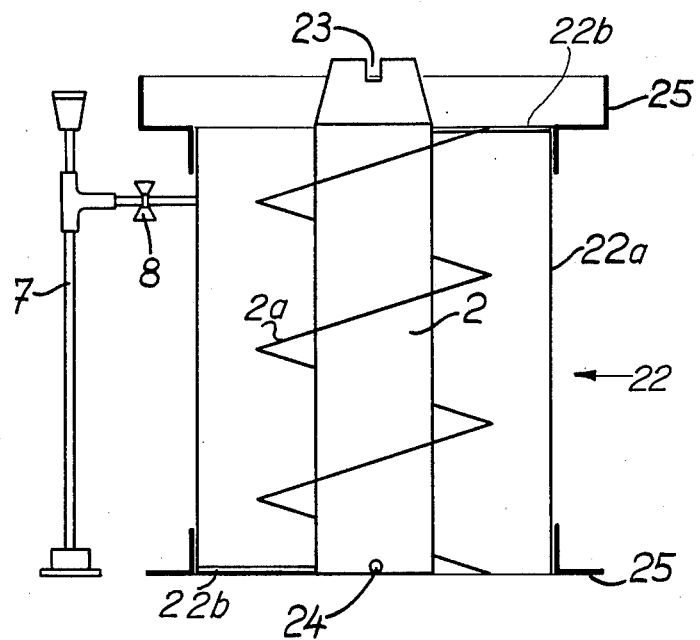
FIG. 9 shows one element of a further embodiment.

FIG. 9 shows an embodiment suitable for fitting in chimneys from the lower end, consisting of elements 22 manufactured with dimensions compatible with the opening that can be provided in the lower end of the chimney. The height of these elements can thus be selected, and their inner diameter determined as a function of the space available and the volume to be evacuated. The flow of washing liquid is supplied by a pipe 7 outside the elements 22 but inside the chimney (not shown), and which can be coupled during installation of the elements by means of quick-fitting unions. In this manner, as many flowing stations as are required can be provided, each with a valve 8 controlled by a probe, not shown.

For safety reasons, it is preferable to separately supply all of the flowing stations, so that valves controlling the outputs can be located at the lower end of the column outside the chimney.

In this variant, the supply of liquid takes place generally tangential to the wall of the lining through oblique inlets in a manner to provide a helical flow around the lining.

The elements 22 are complete integral units comprising both a tubular lining-forming part 22a, integral spacers 22b, and a central helicoidal structure comprised of helicoidal convolutions 2a disposed on the lateral surface of the cylindrical core 2, the upper end of this core protruding into the preceding element so as to serve as a guide for the assembly. The spacers 22b define means for integrally connecting a core 2 and a respective tubular lining segment 22a.

To obtain continuity of the helicoidal surface, a notch 23 and a lug 24 are disposed respectively at the top and bottom of the core of each element, so as to provide an exact angular positioning rapidly during assembly. Because of the overhang of the upper profile of each element, it is possible instead of reinforcing the sheet metal according to the load, to avoid flames passing through the lining by welding complementary tubes or profiles 25 into the outside of the lining.

Figure 10:
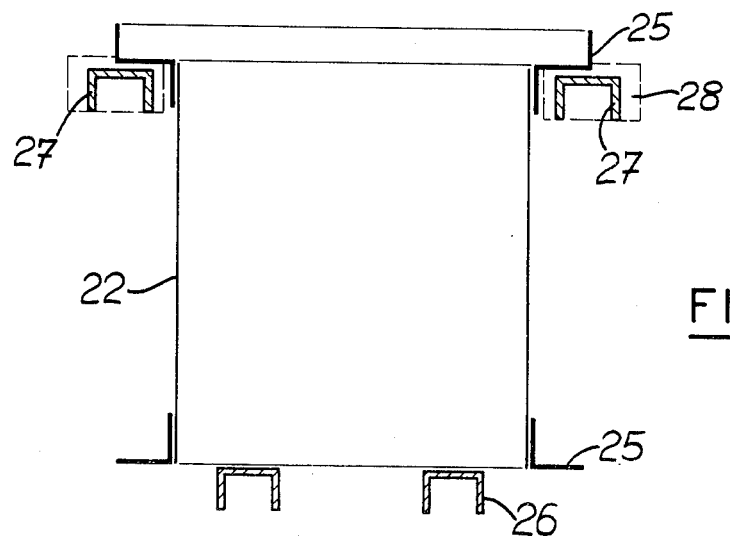
FIG. 10 shows a system for mounting the element of FIG. 9.

Mounting of the elements, which progressively support a greater load as the length of the lining is increased, is carried out by any appropriate means, for example the cross-bars 26 of a hydraulic pump device as shown in FIG. 10. Momentary support of the lining, while the hydraulic pump is loaded, with a fresh element, can be provided by U-shaped or other suitably shaped supports 27 sliding laterally in a housing 28 fixed in the chimney and which remains in place to facilitate dismantling of the lining, if required, at a later date.

Figure 11:
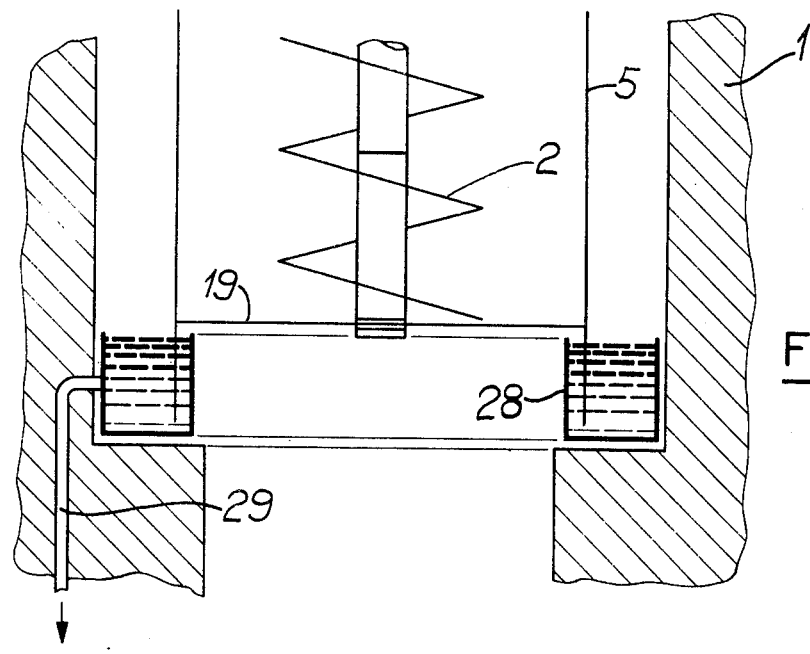
FIG. 11 is a cross-section of the lower part of a chimney according to the invention.

The bottom of the chimney (FIG. 11) is equipped in such a manner that the flow of washing liquid is recovered in an annular trough 28 into which the lower end of lining 5 extends. An outlet conduit 29 delivers the liquid to a decantation tank where the PH of the liquid is re-established so as to be able to re-use the liquid in a closed circuit. The cleaning liquid used is of course adapted to the type of smoke or gas to be purified. For example, water made basic by the addition of caustic soda is suitable for smoke from combustion, or water with added chlorine for organic odors. For certain special cases, an oxygenated-water mixture can be used.

In the case of very hot smoke, it is preferable to install a probe connected to an electro-magnetic valve controlling a battery of nozzles and sprays supplied with cold water, so as to provide an overall initial cooling of the gases being treated.

What is claimed is:

1. In a chimney of the type having an inner central helicoidal structure extending along a longitudinal axis thereof to impart a helical movement to gases rising through the chimney, and means for introducing a liquid within the chimney, wherein the improvement comprises:
    an inner lining disposed within the chimney and comprising a plurality of stacked tubular segments each having end portions defining means cooperative with the end portions of adjacent ones of said stacked tubular segments to maintain said stacked tubular segments in alignment,
    a plurality of cylindrical cores having interengaging end portions and each having helicoidal convolutions disposed on a lateral surface thereof, said plurality of cylindrical cores disposed interengaged within said inner lining and extending along a longitudinal axis thereof and the helicoidal convolutions disposed on said interengaged cylindrical cores jointly defining said helicoidal structure, and
    means for integrally connecting at least one of said interengaged cylindrical cores and a corresponding one of said stacked tubular segments in a manner to permit them to be jointly inserted and removed from within the chimney and to maintain said central helicoidal structure aligned within said lining.

2. In a chimney according to claim 1, wherein said at least one of said interengaged cylindrical cores is positioned within said corresponding one of said stacked tubular segments for maintaining said plurality of interengaged cylindrical cores coaxial with said lining.

3. In a chimney according to claim 1, wherein said cylindrical cores are tubular.

4. In a chimney according to claim 1, wherein said tubular segments comprising said lining each comprise an inner wall and an outer wall spaced from said inner wall.

5. In a chimney according to claim 4, wherein an upper one of said tubular segments includes means defining a liquid reservoir for receiving liquid, and further comprising means for delivering said liquid at a controlled rate to said means defining a liquid reservoir.

6. In a chimney according to claim 4, wherein the upper portion of said outer walls are widened and perforated and the lower portions of said inner walls extend beyond the lower portions of said outer walls, whereby adjacent upper and lower end portions of said stacked tubular segments define spaces in communication with the spaces defined between the walls of corresponding lower tubular segments through the perforations in the upper portions of the outer walls of said corresponding lower tubular segments.

7. In a chimney according to claim 1, wherein the interengaging end portions of said cylindrical cores comprise means for fixing the relative angular positions between adjacent ones of said interengaged cores so that the helicoidal structure defined by said helicoidal convolutions is continuous.

8. A chimney lining with a central helicoidal structure for installation in a preexisting chimney, comprising:
    a tubular segment stackable end-on-end and coaxially with like tubular segments to jointly define therewith a chimney lining, and having end portions defining means for cooperating with the end portions of adjacent tubular segments in a stacked condition to maintain the stacked tubular segments in alignment, said tubular segment comprising an inner wall and an outer wall spaced from said inner wall, and
    a corresponding central helicoidal structure comprising an axial cylindrical core within said tubular segment and having helicoidal convolutions disposed on a lateral surface thereof, said cylindrical core having end portions interengagable with end portions of like cylindrical cores within adjacent tubular segments and having helicoidal convolutions disposed thereon to jointly define with said corresponding central helicoidal structure a helicoidal structure extending along a longitudinal axis of stacked tubular segments, spacer means integrally connecting said tubular segment and said axial cylindrical core comprising said central helicoidal structure, whereby said tubular segment and said corresponding helicoidal structure may be simultaneously installed in a preexisting chimney.

* * * * *